United States Patent [19]

Shimada

[11] Patent Number: 4,856,949
[45] Date of Patent: Aug. 15, 1989

[54] ROTATIVE TOOL FOR REPAIRING ELECTRODES FOR SPOT WELDING

[76] Inventor: Toshiaki Shimada, 41-2, Kawauchi 2-chome, Asaminami-ku, Hiroshima-shi, Hiroshima-ken 731-01, Japan

[21] Appl. No.: 255,653

[22] Filed: Oct. 7, 1988

[51] Int. Cl.⁴ .............................................. B23C 3/12
[52] U.S. Cl. .................................. 409/140; 219/119; 407/42; 409/181
[58] Field of Search .............. 409/139, 140, 175, 181; 219/119; 407/33, 9, 43, 42

[56] References Cited

U.S. PATENT DOCUMENTS

| | | | |
|---|---|---|---|
| 2,284,483 | 5/1942 | Whitesell, Jr. | 409/181 X |
| 2,286,931 | 6/1942 | Radeke | 409/181 X |
| 2,418,767 | 4/1947 | Hall | 407/33 |
| 2,638,817 | 5/1953 | Hall | 407/33 |
| 2,930,289 | 3/1960 | Swarts | 409/181 |
| 3,820,437 | 6/1974 | Dyer et al. | 409/140 |

FOREIGN PATENT DOCUMENTS

| | | | |
|---|---|---|---|
| 1224775 | 6/1960 | France | 219/119 |
| 138484 | 8/1986 | Japan . | |
| 206578 | 9/1986 | Japan | 219/119 |
| 185587 | 11/1986 | Japan . | |
| 113878 | 7/1987 | Japan . | |
| 524348 | 8/1940 | United Kingdom | 219/119 |
| 1189104 | 4/1970 | United Kingdom | 219/119 |

*Primary Examiner*—William Briggs
*Attorney, Agent, or Firm*—Flynn, Thiel, Boutell & Tanis

[57] ABSTRACT

In a spot welding to effect welding overlaid metal plates clamped by two opposite electrodes to which greater current is applied, tips of the electrodes are frustoconically shaped. Rotative tool (1) having recesses (H, J) respectively of reverse frustoconical shapes is provided with edged portions of notched portions formed by notching radially the peripheral wall thereof and through holes provided at the notched portions. Cut powder generated when the electrodes are cut is dropped off downward from the through holes. Tip ends on ceiling surfaces of the electrodes are cut at the same time by edged portion formed at upper edges (3) provided at the diameter of an extended portion (61) formed by extending over perforated bottoms of the recesses.

4 Claims, 3 Drawing Sheets

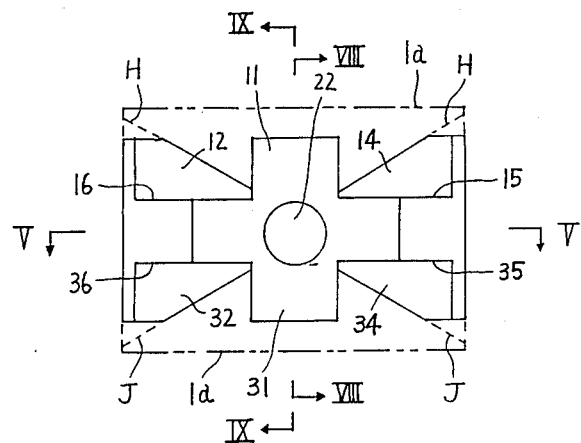
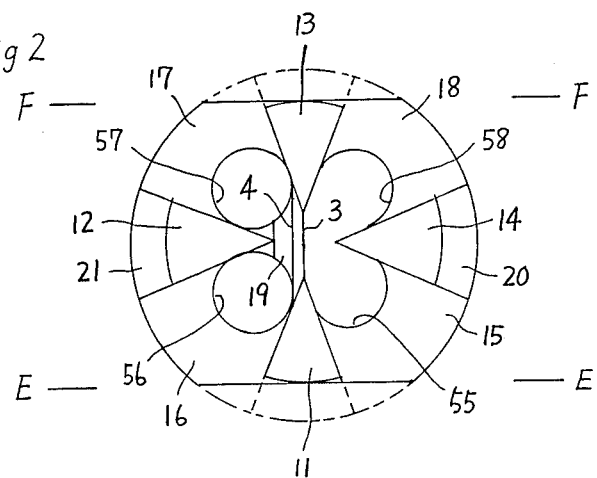
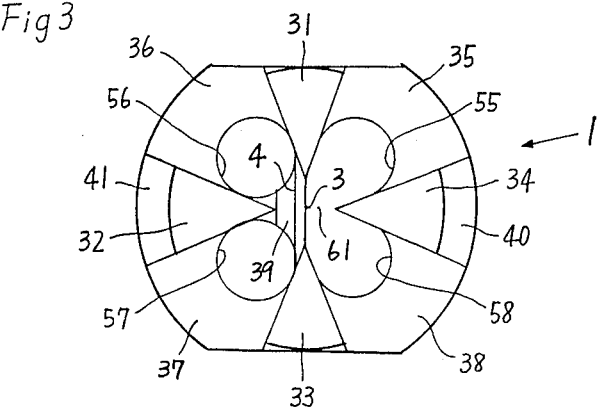

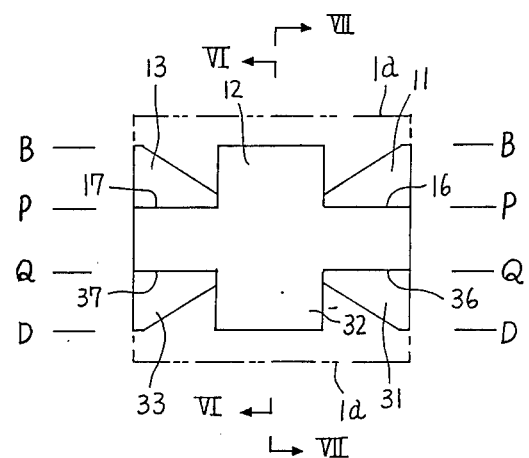
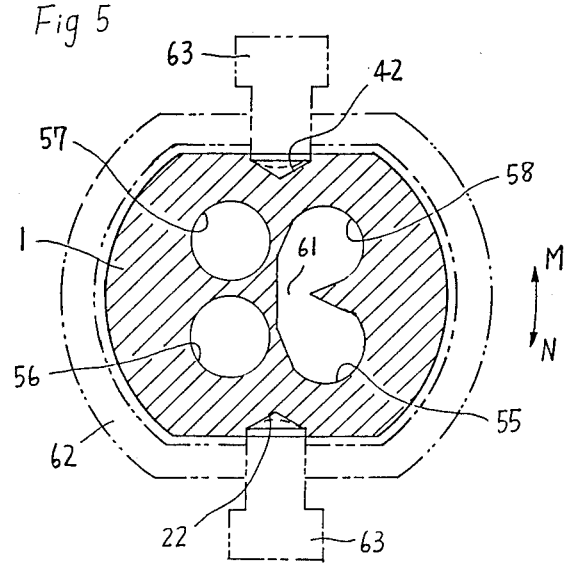
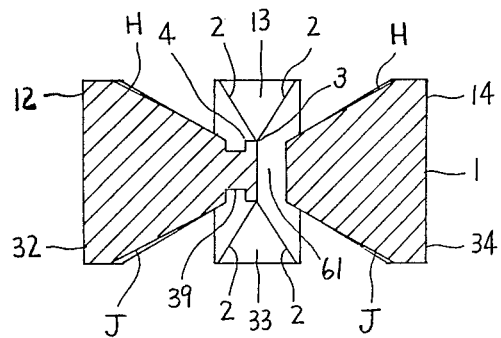

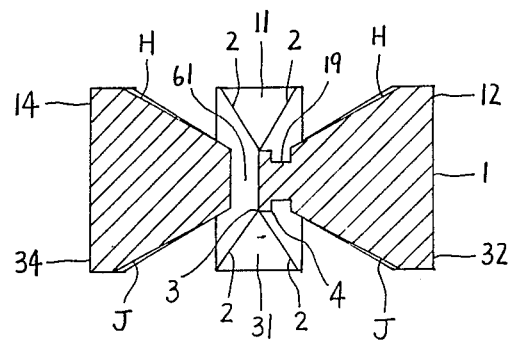
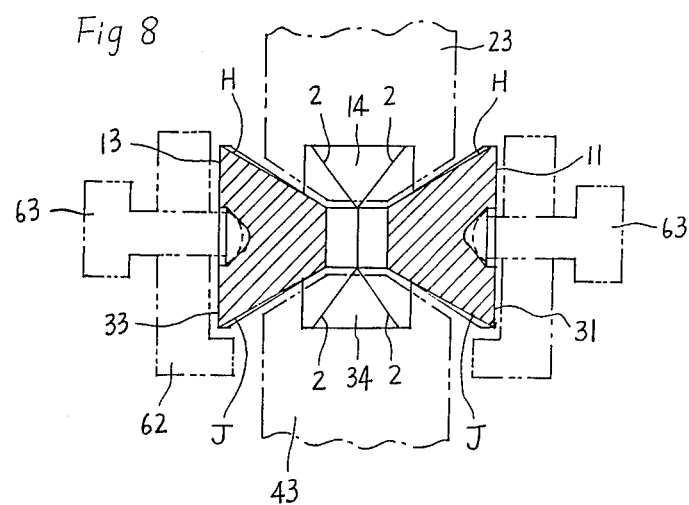
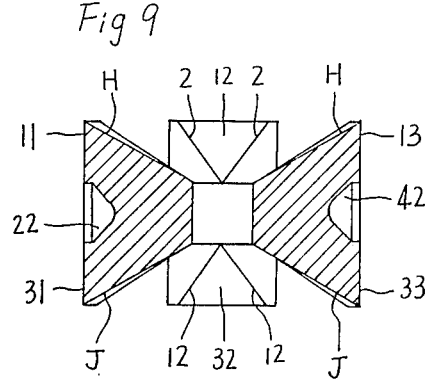

ROTATIVE TOOL FOR REPAIRING ELECTRODES FOR SPOT WELDING

BACKGROUND OF THE INVENTION

1. Field of the Invention:

The present invention relates to a rotative tool for repairing elecrodes for spot welding by cutting tips of the electrodes when they were worn and deformed.

2. Prior Art:

Tips of the electordes are usually frustoconically shaped. Accordingly, the electrodes are repaired by cutting the tips thereof in the frustoconical shape. One method to repair the electrodes is cutting the tips thereof manually by a hand file. However, such cutting operation is effected with less accuracy and takes much time. Another method to repair the electrodes is cutting the tips thereof by the rotative tool having frustoconical recesses provided at an upper and lower surfaces of the rectangular pole and formed by radially cutting off the conical portions of the frustoconical recesses. The tips of the electrodes are cut with use of the rotative tool by rotating the tips of the two electrodes at the state where the tips of the two electrodes are engaged in the conical recesses of the rotative tool and are biased by the rotative tool. The rotative tool has the shortcoming that cut powder generated in the cutting operation of the electrode is hardly discharged, sharpness thereof is deteriorated with generation of the cut powder and the life of the repaired electrodes is short.

SUMMARY OF THE INVENTION

It is an object of the present invention to provide a rotative tool for repairing electrodes for spot welding enabling to discharge the cut powder of the electrodes with ease and having superior sharpness as well as having long life.

The above and other objects, features and advantages of the present invention will become more apparent from the following description taken in conjunction with the accompanying drawings.

BRIEF DESCRIPTION OF THE DRAWINGS

FIG. 1 is a front elevational view of a rotative tool for repairing electrode for spot welding according to an embodiment of the present invention;

FIG. 2 is a plan view of FIG. 1;

FIG. 3 is a bottom view of FIG. 1;

FIG. 4 is a left side view of FIG. 1;

FIG. 5 is a view taken along V—V of FIG. 1;

FIG. 6 is a view taken along VI—VI of FIG. 4;

FIG. 7 is a view taken along VII—VII of FIG. 1;

FIG. 8 is a view taken along VIII—VIII of FIG. 1; and

FIG. 9 is a view taken along IX—IX of FIG. 1.

DESCRIPTION OF THE PREFERRED EMBODIMENT

An embodiment of the present invention will be described more in detail with reference to the attached drawings.

An upper surface and a lower surface of the cylindrical tool memeber 1a as illustrated in one dotted and one solid lines (imaginary lines) in FIGS. 1, 2 and 4 are cut off respectively along horizontal planes B and D. A front side and a rear side of the cylindrical tool member 1a are then cut off along the vertical planes E and F. Recesses H and J each having a reverse frustoconical shape are provided at the upper and lower cut surfaces. Upper fun shaped projections 11 through 14 and lower fun shaped projections 31 through 34 are respectively provided at front and rear portions, left and right portions, and upper and lower portions respectively of outer peripheral walls of the upper and lower recesses H and J. Portions other than the upper and the lower projections are notched along the same planes P and Q as those flushing to bottoms of the recesses H and J to form upper notched portions 15 through 18 and lower notched portions 35 through 38. Through holes 55 through 58 are respectively provided in vertical direction at each notched portion. The through holes 55, 58 among the through holes 55 through 58 provided at one of the right and left portions are communicated with each other at extended portion 61 formed by extending over perforated bottoms of the recesses H and J. Edged portions are formed at the inclined edges 2 of the upper projections 11 through 14 and the lower projections 31 through 34 and at upper edges 3 provided on the diameter of the extended portion 61.

It is preferable to provide other edged portions at upper edges 4 of small grooves 19, 39 provided at the bottoms of the recesses H and J which permit the other through holes 56, 57 to communicate with each other. Furthermore, flat surfaces 20, 21, 40, 41 respectively having shapes of a circular arc are provided when required at the both surfaces of the upper and the lower projections 14, 12, 34, 32. Still furthermore, recesses 22, 42 in which bolts are screwed are provided at the front and rear ends of the tool memeber 1a.

Operation of the rotative tool for repairing electrodes for spot welding composed of elements mentioned just above according to an embodiment of the present invention will be described hereafter.

The rotative tool 1 is surrounded by a rotary frame 62, and bolts 63 are screwed into the recesses 22 42 through the frame 62. When the rotary frame 62 is turned in the direction of M or N while the tips of the electrodes 23, 43 are respectively engaged into the recesses H and J of the rotative tool 1, tapered portions close to tips of the electrodes are cut by the edged portions formed at the inclined edges 2 of the projections 11 through 14 and 31 through 34. At the same time, tip ends or ceiling surfaces of the electrodes 23, 43 are cut off by edged portion formed at the upper edges 3 and the edged portion formed at the upper edges 4.

The cut powder of the electrodes 23, 43 generated at the cutting operation is dropped off downward through the extended portion 61 and the through holes 55 through 58. Thus, the cut powder are not residual in the rotative tool 1 so that the sharpness is not deteriorated. Furthermore, the rotative tool 1 can be kept in the same state as the new tool by using it in the manner to turn the rotative tool 1 inside out and upside down.

Although the invention has been described in its preferred form with a certain degree of particularity, it is to be understood that many variations and changes are possible in the invention without departing from the scope thereof.

What is claimed is:

1. A rotative tool for repairing electrodes for spot welding comprising:
   (a) a cylindrical tool member (1a);
   (b) upper and lower recesses (H, J) having respectively frustoconical shape and formed by cutting upper and lower ends of the cylindrical tool memeber (1a) along horizontal planes (B, D), then cutting front and rear ends of the cylindrical tool member (1a) along vertical planes (E, F);

(c) four fan shaped upper projections (11 through 14) and four fan shaped lower projections (31 through 34) provided at front and rear portions, left and right portions, and upper and lower portions respectively of outer peripheral walls of the upper and lower recesses (H, J);

(d) four upper notched portions (15 through 18) and four lower notched portions (35 through 38) provided at the peripheral walls notched along same planes (P, Q) as those flushing to bottoms of the recesses (H, J);

(e) through holes (55 through 58) provided in vertical direction at each notched portion, two through holes (55, 58) among through holes (55 through 58) being communicated with each other by an extended portion 61 formed by extending over perforated bottoms of the recesses (H, J); and (f) edged portions (2) provided at inclined edges of the upper and the lower projections (11 through 14; 31 through 34) and at upper edges (3) along the diameter of the extended portion (61).

2. A rotative tool for repairing electrodes for spot welding according to claim 1, wherein other through holes (56, 57) among the through holes (56 through 58) are communicated with each other by small grooves (19, 39) provided at the bottoms of the recesses (H, J) to form edged portions at upper edges (4) of the small grooves (19, 39).

3. A rotative tool for repairing electrodes for spot welding according to claim 1 further including flat portions (20, 21; 40, 41) respectively having shapes of a circular arc provided at the upper and lower surfaces of right and left projections (14, 12; 34, 32).

4. A rotative tool for repairing electrodes for spot welding according to claim 1, wherein the tool member (1a) is provided with recesses (22, 42) in which bolts are screwed at front and rear ends thereof.

* * * * *